March 15, 1949. E. A. STALKER 2,464,726
ROTARY WING AIRCRAFT
Filed Sept. 18, 1944 2 Sheets-Sheet 1

INVENTOR.
Edward A. Stalker

March 15, 1949.  E. A. STALKER  2,464,726
ROTARY WING AIRCRAFT

Filed Sept. 18, 1944  2 Sheets-Sheet 2

INVENTOR.
Edward A. Stalker

Patented Mar. 15, 1949

2,464,726

UNITED STATES PATENT OFFICE 2,464,726

ROTARY WING AIRCRAFT

Edward A. Stalker, Bay City, Mich.

Application September 18, 1944, Serial No. 554,655

5 Claims. (Cl. 170—135.2)

My invention relates to direct lift aircraft and particularly to the blades of the lifting rotor. One object is to provide a helicopter capable of operating at a large thrust coefficient so that it can lift a large weight per horsepower. Another object is to provide a type of blade which is adapted to a high load per horsepower and to efficient high speed performance as well. Other objects will appear from the description and drawings in which—

The horsepower required to rotate a helicopter rotor is composed of a part to overcome the induced drag and a part to overcome the profile drag. It is with the profile drag part that this invention is concerned.

The present day design practice is to select such an angle of attack that the lift coefficient of the blade is relatively small, of the order of 0.4, for a given solidity and tip speed.

I use a very high lift coefficient so that the tip speed can be reduced, thereby reducing the amount of power expended in overcoming frictional (profile) drag. The induced power may increase as a result of the greater disk loading but the actual weight carried per horsepower increases.

In order to retain the maximum gain from the high lift the blade should have an airfoil section which produces the high lift coefficient at a relatively low value of the profile drag coefficient and yet the airfoil must be suitable for high speed flight. I have found that these conditions can be satisfied by a blade having the airfoil section 1 shown in Figure 1.

The airfoil section has an arched mean camber line 2 in contrast to contemporary helicopter airfoils which have a straight mean camber line. Preferably the mean camber line lies above a circular arc 4 drawn through its ends and its mid-point 8.

The airfoil section is convex and its thickness increases steadily preferably to the mid-point of the chord or even as far rearward as the 60 per cent point. The advantages of the section become significant as the maximum thickness ordinate is moved rearward beyond the 0.4 point of the chord. The aft upper contour is convex and therefore substantially free of reversals of curvature.

Figure 3:
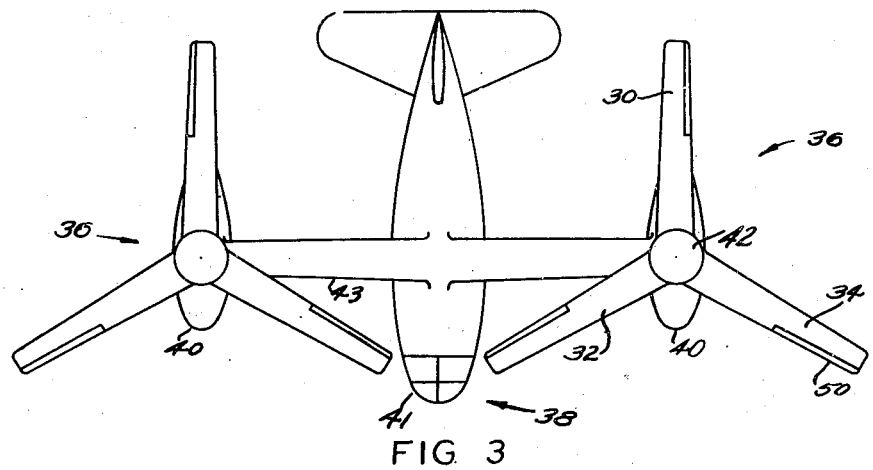
Figure 3 is a fragmentary top view of the aircraft.
Figure 2:
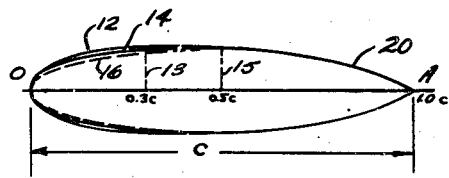
Figure 2 is a diagram outlining the contour of the basic airfoil section.

The basic airfoil section is first determined with respect to a straight mean line as shown in Figure 2. It is therefore doubly convex and symmetrical with respect to the mean line.

The curve defining the basic airfoil section may vary within a predetermined range. Figure 2 shows by the contours 12 and 16, the limits of variation in the nose contour which permit of keeping the velocity substantially constant along the section. If this velocity is not to vary substantially, the flow should divide at the forward end of the mean camber line. When the division occurs at a point nearer the lower contour the velocity over the nose is increased and while a small increase can be tolerated, it should be kept to a minimum. The contour 12 is an arc of an ellipse whose minor semi-axis 13 is located at 0.3C. The contour 14 is an arc of an ellipse whose minor semi-axis 15 is located at 0.5C. Contours 12 and 14 are faired into the aft portion of curve 20 to form the section contour. The curve 12 defines the upper limit to the ordinates of the nose contour. For the purposes of further discussion the curve portion 12 is considered to extend to the end of the maximum thickness ordinate 15.

The contour 16 is a curve laid off below curve 14. At any station along the chord line the differences between the ordinates of curve 12 and 14 and between 14 and 16 are equal. The curve 16 then defines the lower limit to the ordinates of the nose contour.

It may thus be stated that the preferred contour for the nose portion of the blade section lies within a family of substantially elliptical curves whose mean curve is 14 the minor semi-axis of which is located at 0.5C, and whose outer or boundary curve (of the family) is the elliptic arc 12 extended to the maximum thickness ordinate at the midpoint of the chord. That is by defining one boundary curve and the mean curve, the other boundary curve is immediately defined. The actual blade section is then determined by transferring such curves from a straight line to a highly arched mean camber line.

An airfoil section of any form may be readily converted to a section with an arched mean camber line, and vice versa. This may be done by laying off the abscissa 26 from the origin O along the camber line and describing a circle so that each radial length 22 equals the ordinate of the corresponding basic airfoil section. It is important in so doing that the abscissa be laid off along the mean camber line rather than along the subtending chord line.

Figure 1:
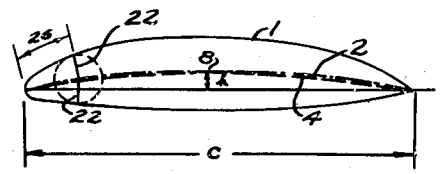
Figure 1 is an airfoil section for a rotor blade.

The mean camber line preferably has the substantially arched form 2 shown in Fig. 1 (dot and dash lines). Its ordinates above the subtending chord are greater at the extremities of the wing than those of a circular arc 4 (shown by dotted lines) of the same maximum height passing through the ends of the chord line. The abscissae are laid off along the mean camber line and the ordinates 22 for upper and lower surfaces are then struck as arcs with their centers on such mean camber line. This defines the upper and lower airfoil surfaces. Following this procedure with the elliptic curve 14 and transferring the same to the arched mean camber line 2 of Fig. 1, the final upper and lower airfoil surfaces for blade 1 are obtained.

The airfoil section is incorporated into the blades 30, 32 and 34 of the rotor 36 which supports the helicopter 38. See Figures 3 to 6. Each nacelle of the machine is 40 to which the hub 42 of the rotor is rotatably attached. The nacelles are attached to the fuselage 41 by the stub wings 43.

The blades are hinger at their inner ends for flapping and the rotor is rotated by a gearing 44 driven by the engine 46. The details of the hub attachment of the blades are not described since these are well established in the art or may follow the scheme outlined in my U. S. Patent No. 2,084,464, granted June 22, 1937.

Figure 5:
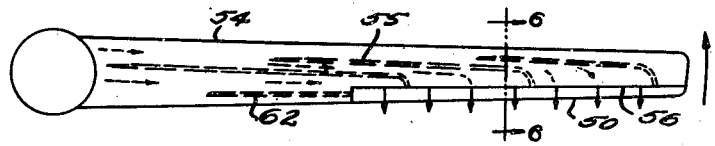
Figure 5 is a top view of a blade and the hub.
Figure 4:
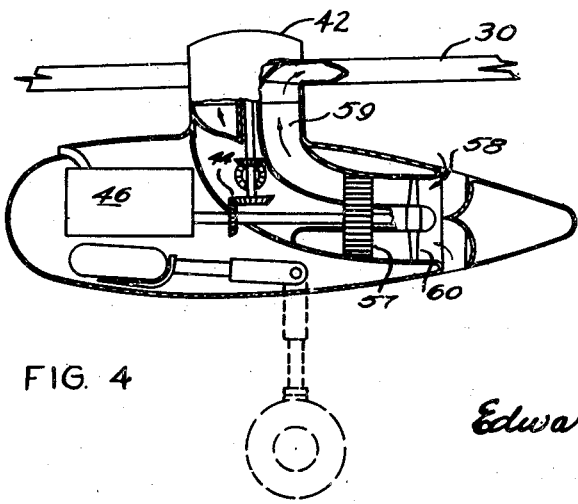
Figure 4 is a fragmentary side elevation of the aircraft nacelle and rotor partly in section.
Figure 6:
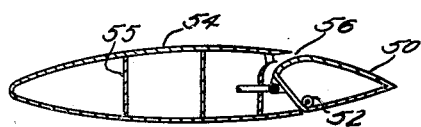
Figure 6 is a section along the line 6—6 in Figure 5.
Figure 11:
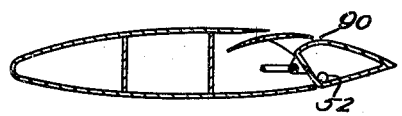
Figure 11 is a section similar to 6—6 showing an alternate form of slot.

The blades each have a flap 50 as shown particularly in Figures 5 and 6. Each flap is adjustably connected by a hinge 52 to the main body 54 of the wing to form between them the slot 56 leading out of the blade interior.

The slot 56 is to be served with a flow of air by the duct 59 connected to a blower 60 driven by the engine. It inducts air through the nacelle slot 58 and forces it through the radiator 57 serving the engine 46. The flap 50 is adjustable by means of torque tube 62, Figure 5, to raised and lowered positions.

Figure 7:
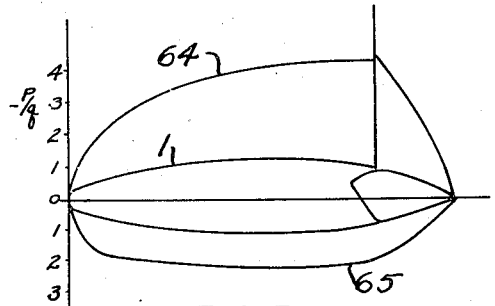
Figure 7 shows the pressure distribution over the airfoil section with the flap in normal position.
Figure 8:
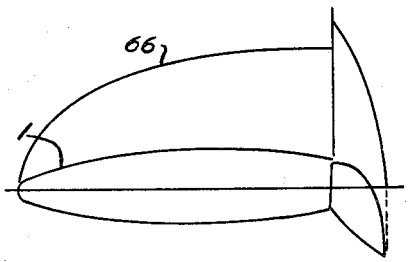
Figure 8 shows the pressure distribution with the flap depressed.

With the described form of airfoil the pressure distributions are as shown in Figure 7 with the flap up and in Figure 8 with the flap down. It is to be noted that with flap up the pressure increases steadily to the locality of maximum thickness on both the upper and lower surfaces as indicated by the pressure distribution curves 64 and 65. This leads to a low drag.

With the flap down the pressure gradient curve 66 is still favorable over the upper surface because of the shape of the mean camber line and the distribution of the maximum thickness. Thus over the upper forward portion of the blade a low drag prevails. The drag of the flap portion is also low because of the effect of the jet discharged from slot 56. It is to be noted that the jet aids in propelling the blade and hence its energy is to be charged to propulsion and not to the wing drag. The jet also serves the purpose of cooling the engine and de-icing the wings since the jet air flows through the radiator 57.

It is to be understood that the rotors are to incorporate within the housing 42 a cyclic pitch changing mechanism along the lines of that displayed in my U. S. patent to which reference has been made or as shown in my companion case Serial No. 554,656.

It is important that the large lift coefficients be realized at low values of the drag coefficient. To obtain the high lift the jet must issue from the upper surface of the wing aft of the mid point of the blade section chord and preferably in the vicinity of the 0.6C point. To obtain the low drag, the jet, which has a higher velocity than the relative wind, must not rub on too large an expanse of wing surface or the drag will be increased because of the increased velocity. From the drag point alone the slot should be near the trailing edge. From the standpoint of both the lift and drag for the helicopter use, the slot location becomes critical between the mid point of the chord and the 0.8 chord point measured from the section nose point. Thus the useful blade section is characterized by a continuous surface back to the flap where the first slot is located.

If for special conditions the flap chord is less than 20 per cent of the blade chord length, the slot is still preferably at the forward end of the exposed surface of the flap.

The winng covering is supported by the spars 55 which also serve to conduct the airflow to the slot 56. They do not extend the full span of the blade but each overlaps the other for a short distance so that the bending stress can be transferred from one to the other. They are spaced chordwise to admit the proper amount of flow to a spanwise portion of the slot 56. By terminating the spars or partitions so that they do not overlap for a great length the resistance to the internal flow is greatly reduced since the resistance coefficient is a function of the cross sectional area as well as the wall surface. The type of partition shown is free from abrupt changes in cross section from the entrance of each duct to the exit of the slot 56. This also conserves the energy of the flow by avoiding rapid expansion.

The flap is in its normal position when the airfoil section corresponds to the basic section distributed over the substantially continuous mean camber line giving a doubly convex airfoil. In this position of the flap the chord subtending the mean camber line does not cut the airfoil contour.

In order to use large lift coefficients efficiently the blade must have a large twist so that the root sections have a much greater pitch angle that the tip. This is necessary so that the lift distribution over the swept disk area is substantially uniform. This is the condition for maximum efficiency. Yet in forward flight the pitch change from root to tip should be very small. The difficulty of these contrary requirements has been resolved by a special flap plan form.

Figure 5 shows a top plan of the blade and it is to be noted that the ratio of flap chord to wing chord is greater for the root section than for the tip section of the blade. With this plan form, when the flap is depressed, the pitch is changed to a greater extent at the root than at the tip. This may be deduced from the airfoil geometry.

Figure 9:
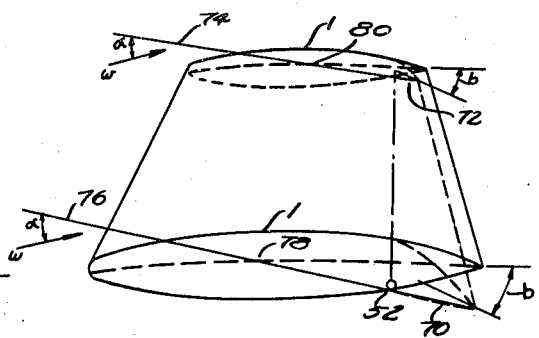
Figure 9 is a fragmentary diagrammatic view of a blade with the flap in two positions.

In Figure 9 the root flap section is 70 and the tip flap section is 72. Each has been rotated through the same angle $b$ about the hinge 52 because they each belong to the same rigid flap structure. For each section the zero lift lines 74 and 76 are constructed by drawing a line through the trailing edge of the airfoil section and its mid point of the mean camber lines 78 and 80. These are the proper lines against which to measure the angles of attack $\alpha$ relative to the wind direction W. It will be seen that the angle of attack of the root section has increased to a greater value than that of the tip section. Thus when the helicopter is hovering there is a great variation in pitch from the root to the tip of the blade but in high speed flight with the flap up the pitch variation is small and of the value which is built into the main body 54.

As the blade section increases in thickness, the location of the ordinate of maximum thickness is moved forward. Thus the root sections of the blade have their maximum thickness substantially further forward than the tip sections. This is done to make the flow follow the contours of the rear half of the section which, because of the greater thickness, tend to converge too quickly to the trailing edge. On the outer portions of the blade the angle of convergence is less and the flow is restrained from separating by the action of the jet from the slot.

The angle of attack of the blade section should be adjusted to the flap position so that the relative wind divides at the nose at the end of the mean camber line.

In discussing the lift of the rotor as a whole it is best to use non-dimensional terms and hence the term thrust coefficient is introduced to distinguish it from the lift coefficient of the blade sections. The thrust coefficient $T_c$ is defined by the equation for the total thrust $$T = T_c \pi R^2 \rho \overline{\Omega R}^2 \tag{1}$$

where R is the radius of the rotor, $\Omega$ (Omega) is the angular speed, and $\rho$ is the mass density of the air.

The torque coefficient is defined by the equation $$Q = Q_c \pi R^2 \rho \overline{R\Omega R}^2 \tag{2}$$

The torque coefficient is composed of components arising from the profile drag of the blades and from the lift carried by the blades. The greater the lift coefficient the greater the torque coefficient. For a given disk loading of the rotor the torque arising from the lift is fixed but because the thrust coefficient is large the rate of rotation of the blades can be small which saves on the torque arising from the profile and frictional drag. The power for overcoming the profile drag varies as the cube of the angular velocity so that very great savings are effected by reducing the rate of rotation. The provision of a wing suitable for this method of operation is a feature of this invention.

Because the rate of rotation is low, propulsion by the jet flow from the slot 56 is not practicable. The loss in efficiency from a jet drive would dissipate the gains from the type of operation described. For this reason the rotor is driven by a mechanical transmission connecting the rotor to the prime mover.

In contemporary designs the rate of rotation of the rotor is kept large so that for a given power expenditure the torque will be small. As a consequence, the power wasted in a counter-torque propeller at the tail of the machine is small. However if the rate of rotation were small the rotor torque would be large and the amount of power wasted would be prohibitive.

I go counter to this scheme by using very high thrust coefficients which give rise to very high torques. I achieve the high thrust coefficients with special lift coefficients from special wing forms, thereby achieving great efficiency in the rotor itself for a given frictional or profile drag. I then preserve this gain in efficiency by employing twin rotors rotating in opposite directions to offset each other's torque.

Figure 10:
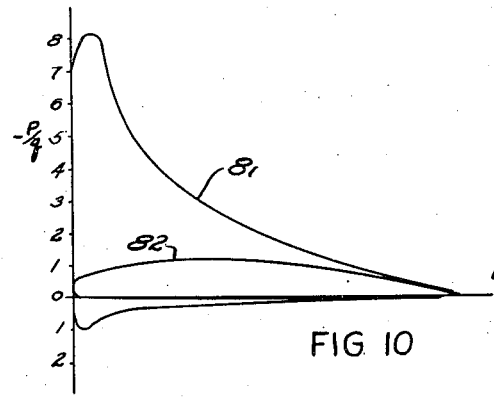
Figure 10 shows the pressure distribution over a conventional airfoil section at a large angle of attack.

By making the airfoil section of the shape described the velocity is substantially constant along the forward 60 per cent of the chord and is free of a peak value such as the conventional wing section has, as shown in Figure 10.

I have discovered that airfoil sections substantially of the type described have very closely equal profile drag coefficients over a range of lift coefficients much higher than values now used even though the airfoil sections vary as much as 100 per cent in thickness. (The minimum drag coefficients are however substantially proportional to the thickness of the blade sections.) Thus in the range of large $C_L$'s the profile drag coefficient for an airfoil section of thickness equal to 18 per cent of the chord is no greater than one of 9 per cent of its chord. I therefore use airfoil sections whose thickness at the inner end of the blade may reach 30 per cent of the chord. I prefer however a value of about 22 per cent for the root section and a value of 15 per cent for the section at 0.7 of the rotor radius.

In order to obtain the large thrust coefficients for the rotor the blades must be set at a relatively large pitch angle measured between the zero lift line of the blade section at the 0.7 tip radius. This pitch is to be higher than values attained with present blades which operate at lift coefficients of about 0.4. These blades cannot exceed a $C_L$ of 1.0. The expression for the corresponding pitch angle $\beta$ (Beta) is developed as follows.

Let the vertical thrust on an annulus of the rotor be $T_1$, the radius at $0.7R_1$ ($R_1$=tip radius) be R and $v$ the inflow velocity. For an annulus at $0.7R_1$ of width $l$, we have from the momentum theory $$T_1 = \pi R l \rho v . 2v$$
$$= 2\pi R l \rho v^2 \tag{3}$$

as is well known in aerodynamics.

For B blades $$T_1 = B 2\pi R l \rho v^2 \tag{4}$$

But also from the lift on the B elements of chord C $$T_1 = B k C_L \frac{\rho(v^2 + V_p^2) Cl}{2} = 2B\pi R l \rho v^2 \tag{5}$$

where $C_L$ is the lift coefficient at the 0.7 radius (0.7 $R_1$), and $V_p$ and C are respectively the peripheral velocity and the chord at the 0.7 radius. The coefficient $k$ is known from propeller theory [1]

---
[1] Aerodynamic Theory—W. F. Durand, page 242.

to be 0.57 and is used to make the element of the blade at 0.7 radius representative of the whole propeller.

From Equation 4 we have $$kC_L(v^2 + V_p^2) = \frac{4\pi R^2 v^2}{CR} = \frac{4v^2}{\sigma} \tag{6}$$

where $$\sigma = \frac{A}{\pi R^2} = \frac{BC}{\pi R}$$

$A$ = total blade area
$= BRC$

Figure 12:
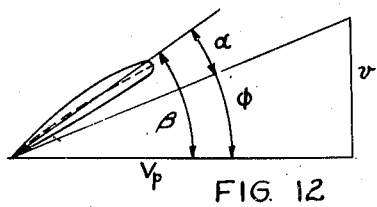
Figure 12 is a diagram of a blade section and the relative wind vectors.

Hence $$\frac{v}{V_p} = \sqrt{\frac{kC_L\sigma}{4-kC_L\sigma}} = \tan\phi \quad (7)$$

where $\phi$ is the inflow angle as shown in Figure 12.

Then the angle of pitch of the blade section is $\beta = \alpha + \phi$ where $\beta$ is the effective pitch angle measured between the plane perpendicular to the axis of rotation and the zero lift line ($L=0$) of the section.

That is $$\beta = \alpha + \tan^{-1}\sqrt{\frac{kC_L\sigma}{4-kC_L\sigma}} \quad (8)$$

in radians.

It is known from aerodynamic theory that $$C_L = 2\pi\alpha$$

in practice. Hence for $C_L = 1$ $$\beta = \frac{1}{2\pi} + \sqrt{\frac{0.57\sigma}{4-0.57\sigma}} \quad (9)$$

writing the angle in radians equal to its tangent which is very closely correct for the magnitude of angles involved.

If $\sigma = 0.06$ the effective pitch becomes $$\beta = 0.166 + \sqrt{\frac{0.0342}{3.966}}$$
$$= 0.166 + 0.0927$$
$$= 0.258 \text{ radians}$$
$$= 14.8°$$

The pitch angles used in this invention exceed 15° or the value given by Equation 9.

The solidities are to lie between $\sigma = 0.03$ and $\sigma = 0.10$ if the gain from the pitch setting is not to be dissipated.

The pitch angle would have a maximum value of 90° although preferably it would not exceed 50°.

To recapitulate the helicopter rotor is provided with a blade having a special airfoil section, flap and slot which cooperate to make feasible the rotation of the rotor at low tip speeds so that the weight per horsepower is increased by virtue of the saving in profile drag power due to the low peripheral speed. This low speed to be efficient also requires a large variation in pitch of the blades from root to tip. Such a large variation is seriously detrimental to high forward speeds, but this difficulty is resolved by the special flap form.

By operating in the range of large lift coefficients the blades can employ thick sections in contrast to the contemporary use of thin sections selected for low minimum profile drag. This gain is further augmented by the discovery that at large lift coefficients the profile drag coefficients are equal for a wide range of airfoil thickness. The use of the slot flow extends this range of equality to higher values of the lift coefficients. By the use of the greater thickness the local vibration of the blades is reduced, thus eliminating one of the serious troubles of blade operation, and the blade can carry the increased lift with a lower structural weight.

It will be clear that I have provided a unique blade form giving marked improvement in the weight which can be carried for a given power.

I have now described suitable embodiments of my invention which are now preferred. It is to be understood however that the invention is not limited to the particular construction illustrated and described and that I intend to claim it broadly as indicated by the scope of the appended claims.

I claim:

1. In combination in a helicopter, a blade, means to support said blade for rotation about an upright axis, said blade having a basic airfoil section whose maximum thickness lies aft of the 40 per cent point of the chord length from the leading edge and whose upper contour ahead of the maximum thickness ordinate lies in major part within boundary curves whose mean curve is an elliptic quadrant passing through the nose point of the section and the end point of the said maximum thickness ordinate serving as the minor semi-axis of said quadrant, the outer curve of said boundary curves being an auxiliary elliptic quadrant passing through said nose point and the end of an auxiliary minor semi-axis at the 0.3 point of the chord and extending on to the outer end of said maximum thickness ordinate, said auxiliary minor semi-axis being equal to one-half the said maximum thickness of the said airfoil section, the upper aft portion of said airfoil section having a relatively sharp trailing edge, said blade having an adjustable flap, and means for depressing said flap to a lowered high lift position providing a substantial pitch angle for the blade greater than about 15° and less than about 50° at the 0.7 radius of the blade developing high total lift with relatively slow speeds of rotation, said blade having a discharge slot in its upper surface along a substantial portion of the span of the blade, means for discharging a jet of fluid from said slot rearwardly along the upper surface of said flap, the surface of said flap directing the jet downwardly at a substantial angle such that the jet thrust available to rotate said blade is relatively minor, and power means coupled to said blade to supply the major propulsive action to rotate the blade.

2. In combination in a helicopter, a blade, a flap adjustably supported on said blade means to support said blade for rotation about an upright axis, said blade having a basic airfoil section whose maximum thickness lies between stations at 40 per cent and 60 per cent of the chord length from the leading edge and whose upper contour ahead of the maximum thickness ordinate lies in major part within boundary curves whose mean curve is an elliptic quadrant passing through the nose point of the section and the end point of the said maximum thickness ordinate serving as the minor semi-axis of said quadrant, the outer curve of said boundary curves being an auxiliary elliptic quadrant passing through said nose point and the end of an auxiliary minor semi-axis at the 0.3 point of the chord and extending on to the outer end of said maximum thickness ordinate, said auxiliary minor semi-axis being equal to one-half the said maximum thickness of the said airfoil section, the upper aft portion of said airfoil section having a convex curvature, and ending in a relatively sharp trailing edge, said airfoil section at the 0.7 point of the radius having a maximum thickness greater than 12 per cent of the respective chord length, means for depressing said flap to a lowered high lift position providing a substantial pitch angle for the blade greater than about 15° and less than about 50° at the 0.7 radius of the blade developing high total lift with relatively slow speeds of rotation, said blade having a discharge slot in its upper surface along a substantial portion of the span of the blade, means for discharging a jet of fluid from said slot rearwardly along the upper surface of said flap to control the boundary layer on said blade, and power means coupled to the inner end of said blade to effect rotation thereof.

3. In combination in a helicopter, a blade, a flap adjustably supported on said blade means supporting said blade for rotation about an upright axis to support the aircraft, said blade having a basic airfoil section whose maximum thickness lies between stations at 40 per cent and 60 per cent of the chord length from the leading edge and whose upper contour ahead of the maximum thickness ordinate lies in major part within boundary curves whose mean curve is an elliptic quadrant passing through the nose point of the section and the end point of the said maximum thickness ordinate serving as the minor semi-axis of said quadrant, the outer curve of said boundary curves being an auxiliary elliptic quadrant passing through said nose point and the end of an auxiliary minor semi-axis at the 0.3 point of the chord and extending on to the outer end of said maximum thickness ordinate, said auxiliary minor semi-axis being equal to one-half the said maximum thickness of said airfoil section, the surface of said blade determined by said basic airfoil section being developed with respect to an arched mean camber line, the maximum ordinate of which above the subtending chord is greater than 4 per cent of the length of the chord, said airfoil section having an upper aft contour terminating in a relatively thin edge, said blade having a slot in its upper surface extending spanwise along a major portion of the outer semi-span of the blade, means to induce an outward flow through said slot, means to depress said flap to a high lift position providing a pitch angle of the blade greater than about 15° and less than about 50° at the 0.7 radius of the blade developing high total lift with relatively slow speeds of rotation, the upper surface of said blade deflecting said flow downwardly at a substantial angle such that the jet thrust tending to rotate the blade is relatively minor, and power means coupled to the inner end of said blade to supply the major propulsive action to rotate said blade.

4. In combination, in a helicopter, a blade having an adjustable flap, means supporting said blade for rotation about an upright axis, said blade having an airfoil section whose maximum thickness is substantially aft of the 0.4 chord at the 0.7 tip radius and whose sections inboard of the 0.7 tip radius have their maximum thicknesses progressively further forward on their respective chords as the root of the blade is approached, means forming a slot in said blade for discharge of a flow of fluid for control of the boundary layer on the surface of said blade, means for depressing said flap to a lowered high lift position providing a substantial pitch angle for the blade greater than about 15° and less than about 50° at the 0.7 radius of the blade developing a high total lift with relatively slow speeds of rotation, and mechanical drive means to rotate said blade about said axis.

5. In combination in a helicopter, a lifting rotor, means supporting said rotor for rotation about an upright axis, a means of operating the said rotor efficiently at large thrust and torque coefficients including a blade having a flap and an upper surface slot, power means to supply a flow through the blade interior and said slot, said blade at its tip portions having an airfoil section which is substantially convex with its maximum thickness substantially aft of the 0.4C point, means to depress said flap an equal amount for all orbital positions of the blade about said axis to provide a pitch angle of the blade greater than about 15° and less than about 50° at the 0.7 radius of the blade, said blade upper surface directing said jet downward to such an extent that the jet thrust component to rotate said rotor is relatively minor, means supplying the major power to rotate said blade at a relatively low speed required by said blade and pitch angles while preserving the gain in lift per horsepower, and a second lifting rotor rotatable about an upright axis in the opposite sense to the first said rotor to balance the reaction torque of the first said rotor.

EDWARD A. STALKER.

REFERENCES CITED

The following references are of record in the file of this patent:

UNITED STATES PATENTS

| Number | Name | Date |
| --- | --- | --- |
| 1,775,757 | Gay | Sept. 16, 1930 |
| 1,792,014 | Herrick | Feb. 10, 1931 |
| 1,836,406 | Smith | Dec. 15, 1931 |
| 2,041,795 | Stalker | May 26, 1936 |
| 2,372,030 | Stalker | Mar. 20, 1945 |

FOREIGN PATENTS

| Number | Country | Date |
| --- | --- | --- |
| 375,327 | Great Britain | June 14, 1932 |
| 625,166 | Germany | Feb. 5, 1936 |
| 695,918 | Germany | Sept. 5, 1940 |